United States Patent
Bhangale

(10) Patent No.: US 10,201,944 B2
(45) Date of Patent: Feb. 12, 2019

(54) METHOD FOR DYEING A TRANSPARENT ARTICLE MADE OF A POLYMERIC SUBSTRATE WITH GRADIENT TINT

(71) Applicant: ESSILOR INTERNATIONAL (COMPAGNIE GENERALE D'OPTIQUE), Charenton-le-Pont (FR)

(72) Inventor: Sunil Madhukar Bhangale, Singapore (SG)

(73) Assignee: ESSILOR INTERNATIONAL, Charenton-le-Pont (FR)

(*) Notice: Subject to any disclaimer, the term of this patent is extended or adjusted under 35 U.S.C. 154(b) by 119 days.

(21) Appl. No.: 15/329,775

(22) PCT Filed: Jul. 30, 2014

(86) PCT No.: PCT/IB2014/001846
§ 371 (c)(1),
(2) Date: Jan. 27, 2017

(87) PCT Pub. No.: WO2016/016681
PCT Pub. Date: Feb. 4, 2016

(65) Prior Publication Data
US 2017/0217112 A1 Aug. 3, 2017

(51) Int. Cl.
*B29D 11/00* (2006.01)
*G02C 7/10* (2006.01)
*D06P 3/34* (2006.01)
*D06P 5/20* (2006.01)
*B29K 69/00* (2006.01)

(52) U.S. Cl.
CPC ......... *B29D 11/00894* (2013.01); *D06P 3/34* (2013.01); *D06P 5/2005* (2013.01); *G02C 7/105* (2013.01); *B29K 2069/00* (2013.01)

(58) Field of Classification Search
CPC . B29D 11/00894; G02C 7/105; D06P 5/2005; D06P 3/34; B29K 2069/00
See application file for complete search history.

(56) References Cited

U.S. PATENT DOCUMENTS

| 5,201,955 A | 4/1993 | Chika et al. |
| 5,453,100 A | 9/1995 | Sieloff |
| 7,179,848 B2 | 2/2007 | Baillet |
| 7,422,610 B2 | 9/2008 | Kubodera et al. |
| 2002/0138921 A1* | 10/2002 | Baillet ............... B29C 59/16 8/507 |
| 2013/0329184 A1* | 12/2013 | Barzak ............... G02C 7/102 351/159.56 |

FOREIGN PATENT DOCUMENTS

EP 1629961 3/2006

* cited by examiner

*Primary Examiner* — Eisa B Elhilo
(74) *Attorney, Agent, or Firm* — Norton Rose Fulbright US LLP

(57) ABSTRACT

A method for dyeing a transparent article made of a polymeric substrate with gradient tint comprising: a) a first step of photodegrading the polymeric substrate (1) of the transparent article, by irradiation (3) of at least one first surface of the article to UV radiations to produce a gradiently photodegraded surface layer of the polymeric substrate, and b) a second step of dyeing said first face of the article with a dyeing agent so as to diffuse said dyeing agent into the gradiently photodegraded surface layer of the polymeric substrate.

Figure 1:
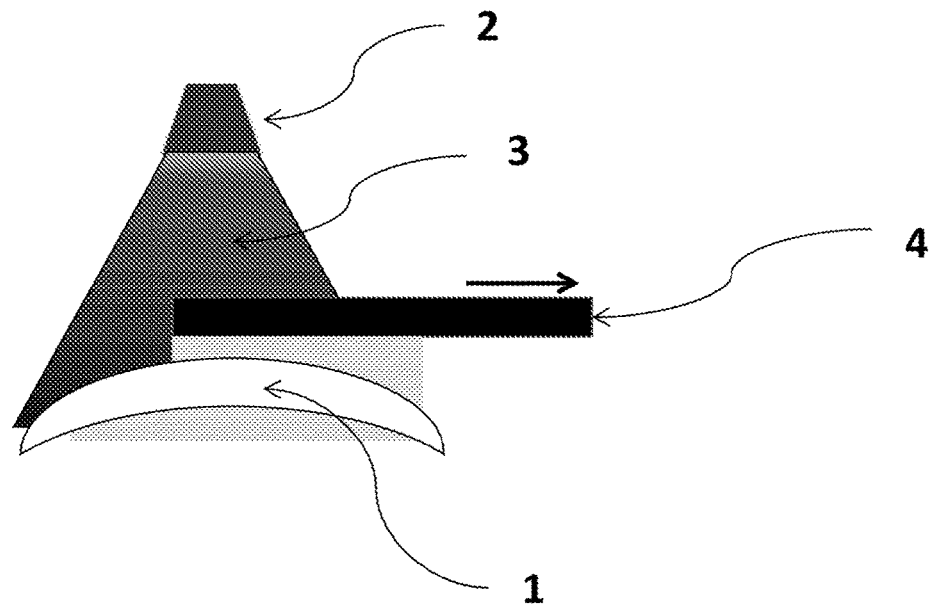

12 Claims, 3 Drawing Sheets a b1 b2 b c1 c2 c

METHOD FOR DYEING A TRANSPARENT ARTICLE MADE OF A POLYMERIC SUBSTRATE WITH GRADIENT TINT

CROSS-REFERENCE TO RELATED APPLICATIONS

This application is a national phase application under 35 U.S.C. § 371 of International Application No. PCT/IB2014/001846 filed 30 Jul. 2014. The entire contents of each of the above-referenced disclosure is specifically incorporated by reference herein without disclaimer.

The present invention relates to the field of tinted polymeric substrates, more particularly to a method for dyeing a transparent article made of a polymeric substrate with gradient tint. The invention is particularly useful for dyeing polycarbonate lens substrates.

Tinted lenses are in demand for fashion as well as health reasons. While fully tinted lenses are most commonly used as sunwear or solar spectacles (goggles), gradient tints gives added advantage of clear vision for prescribed lenses. Generally, gradient tinted lenses are fully tinted on their upper part and become gradually clearer towards the bottom section.

Owing to superior mechanical properties polycarbonate (PC) is highly sought material as lens substrate. Unfortunately, polycarbonate is not easy material to tint. U.S. Pat. No. 7,179,848 B2 proposes a method to dye polycarbonate substrates, said method consisting in irradiating a least one face of the substrate with UV radiation causing the surface of the substrate to be photodegraded over a determined thickness, and in contacting the irradiated face of the substrate with a colouring agent so as to diffuse the colouring agent in the entire thickness of the photodegraded surface layer of the substrate. If this method has the advantages of allowing dyeing polycarbonate substrates with satisfying results, it has however the drawbacks of leading to a uniform colour on the whole surface of the substrate and does not allow the obtaining of a gradient tint.

As described for example in U.S. Pat. No. 5,453,100, most common method to tint a polymeric substrate with gradient is to immerse said substrate into a dying bath comprising a mixture of dye or pigment dissolved in a solvent blend and withdraw it slowly from the dying bath. The blend is made of impregnating solvent, which attacks the polymeric substrate and allows impregnation of the dye or pigment, and a moderating solvent which reduces the aggressiveness of the impregnating solvent. This varies the contact time of the substrate with the dying bath, resulting into varying tint intensity across the length of the substrate. However, such methods use impregnating solvents which are not always safe and it is not always easy to set the correct balance between the respective amounts of the impregnating solvent and the moderating solvent in the blend. Also, the gradual immersion/withdrawal of lens into the dying bath only allows having linear gradient in tint density. It does not allow to tint lenses with annular gradient (variation of tint density from center of lens towards the periphery). Finally, this method is aggressive to the surface of the treated articles and is not always suitable for ophthalmic application. In addition, given the international directives aiming at the reduction of organic solvents, the use of such a method is undesirable.

It has also already been proposed, for example in U.S. Pat. No. 7,422,610 B2, a method involving heating a lens having a dye coating-formed on the surface thereof in a heating furnace to diffuse a dye into the lens. The lens is exposed to heat with a varying temperature across its surface. Such heating results in gradient imbibition of the dye into substrate. However, this method is not very easy to carry out and not always leads to a very regular tint gradient.

Finally, the above-mentioned two methods can only be used to impart linear gradient tint and are therefore not appropriate for the annual gradient tinting of polymeric substrates.

U.S. Pat. No. 5,201,955 describes a lens tinting complex apparatus for annular gradient tinting of eyeglass lenses. According to this patent, the lens has to be engaged in a frame which is both vertically reciprocated and simultaneously rotated about an axis central to and orthogonal to the plane of the lens so that an annular gradient tint is produced darker at the outside edges of each lens and becoming progressively lighter toward the center, with the optical center of the lens either being completely clear or substantially lighter than the rest of the lens. Although allowing an annular gradient tinting of lenses, this apparatus is expensive and difficult to use. In addition it does not allow the linear gradient tinting of polymeric substrates.

Therefore, there is still a need for a simple method allowing gradient tinting of polymeric substrates both linearly or annularly and which does not involve the use of a complex apparatus.

The inventors have now found a method that makes it possible to reach such a goal.

The object of the present invention is thus a method for dyeing a transparent article made of a polymeric substrate with gradient tint, said method comprising:

a) a first step of photodegrading the polymeric substrate of the transparent article, by irradiation of at least one first surface of the article to UV radiations to produce a gradiently photodegraded surface layer of the polymeric substrate, and b) a second step of dyeing said first face of the article with a dyeing agent so as to diffuse said dyeing agent into the gradiently photodegraded surface layer of the polymeric substrate.

The method according to the present invention is easy to carry out. It does not involve the use of undesirable solvents or complex apparatus and leads to transparent polymeric substrates, which can be tinted with a linear or geometrical gradient coloration. By geometrical it is understood a gradient in accordance with a specific geometry such as for example annular, elliptic, rectangular and square gradient colorations, said geometry may be, for example, in accordance with the final geometry of the lens ready to mount in a pair of frame. In addition, the method does not alter the intrinsic properties of the polymeric substrates and leads to a color which is stable over time.

According to this method, the surface layer of the polymeric is gradiently photodegraded during step 1) leading to a gradient thickness of the photodegraded surface layer so that when the polymeric substrate is then dyed during step 2) the immersion of the whole substrate into the dyeing bath for a determined period of time results in the diffusion of the dyeing agent throughout the entire thickness of the photodegraded layer and to a gradient tinting at the surface of the substrate without the need of varying the time of immersion to obtain such a gradient tinting.

According to a preferred embodiment of the invention, during said first step, UV irradiation is applied in a controlled gradient intensity and geometry across the article surface, and after the second step of dyeing, a gradient tint of the transparent article is obtained, said gradient tint matching with the gradient intensity and geometry followed during said first step.

On a same substrate, the thickness of the photodegraded surface layer can thus varies from 0 to 20 µm and more preferably from 0 to 10 µm. The 0 µm thickness of photodegraded surface would mean, the surface is not exposed to UV radiation and would not be tinted during tinting step, leaving it clear.

This method may be used for any thermoset or thermoplastic, homopolymers, copolymers or blends, which could be photodegraded by UV light, and are usually used in ophthalmic field. Mention may be made, by way of examples, of substrates made of polycarbonate, of polyamide, of polyimide, of polysulfone, of copolymers of poly(ethylene terephthalate) and polycarbonate, of polyolefins, in particular of polynorbornene, of homopolymers and copolymers of diethylene glycol bis(allyl carbonate), of (meth)acrylic polymers and copolymers, in particular (meth) acrylic polymers and copolymers derived from bisphenol A, of thio(meth)acrylic polymers and copolymers, of polyurethane and polythiourethane homopolymers or copolymers, epoxy polymers and copolymers and episulfide polymers and copolymers.

For example, it will be possible to use a diethylene glycol bis(allyl carbonate), such as CR39®, in particular with a refractive index of 1.5, sold by PPG Industries, or else a polythiourethane, such as MR7®, in particular with a refractive index of 1.66, sold by Mitsui Toatsu. The substrate made of organic glass preferably has a refractive index of 1.5.

In a preferred embodiment, this method is particularly suited for substrate which is difficult to tint and more particularly for thermoplastic polycarbonate substrates, in particular optical articles such as ophthalmic lens.

The UV radiation of the step of photodegrading the polymeric substrate by irradiation can be performed with any apparatus delivering UV radiation. For example, the UV radiations can be generated by any switchable or retractable UV source.

The UV radiation suitable for the method of the invention may be obtained, for example, by using a Type "D" lamp from the company Heraeus Noblelight Fusion UV Incorporation at 40% of its nominal power. The UV radiation suitable for the method of the invention may also be obtained by using a Type "H" lamp from the company Heraeus Noblelight Fusion UV Incorporation operating at 4.5 J/cm² is used.

Preferably, this lamp is equipped with means to occult UV radiation such as a sliding shutter or a gradient UV filter.

As is well known, UV radiation has a wavelength range from 200 to 400 nm.

According to the method of the invention, the irradiation of the surface of the article is preferably carried out at a wavelength varying from about 200 nm to 400 nm and more preferably at about 320±20 nm.

Also preferably, the energy of the irradiation of the surface of the article due to the UV radiation with wavelength of 320±20 nm, is from about 2.4 to 48 J/cm², more preferably from about 10 to 30 J/cm².

According to a first embodiment, the gradient tint is a linear gradient tint and UV irradiation is controlled linearly by means of a sliding shutter having a main axis, said shutter being interposed between the UV source and the surface layer of the polymeric substrate, and completely overlapping the surface layer of the polymeric substrate before UV source is switched on, said polymeric substrate being progressively slided at a controlled speed along an axis of translation parallel to the main axis of shutter, so as to gradually and completely uncover the surface layer of the polymeric substrate after the UV source has been switched on.

According to a second embodiment, the gradient tint is a linear gradient tint and UV irradiation is controlled linearly by means of a gradient UV filter interposed between the UV source and the surface layer of the polymeric substrate during the whole step of UV irradiation, said filter having a linear UV radiation absorption gradient.

According to a third embodiment, the gradient tint is a geometrical gradient tint and UV irradiation is controlled geometrically by means of a gradient UV filter interposed between the UV source and the surface layer of the polymeric substrate during the whole step of UV irradiation, said filter having geometrical UV radiation absorption gradient.

As a particular example of this third embodiment, the geometrical gradient is an annular gradient tint and the filter has an annular UV radiation absorption gradient.

According to this particular example of the third embodiment, the annular UV radiation absorption gradient may increase gradually from the center towards the periphery of the filter or may increase gradually from the periphery towards the center of the filter.

Figure 2:
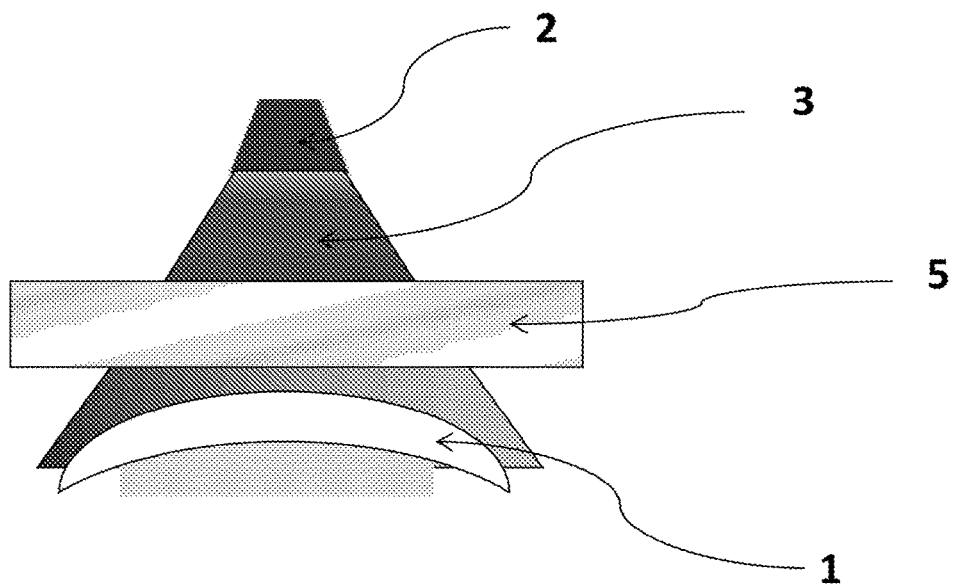
Figure 3:
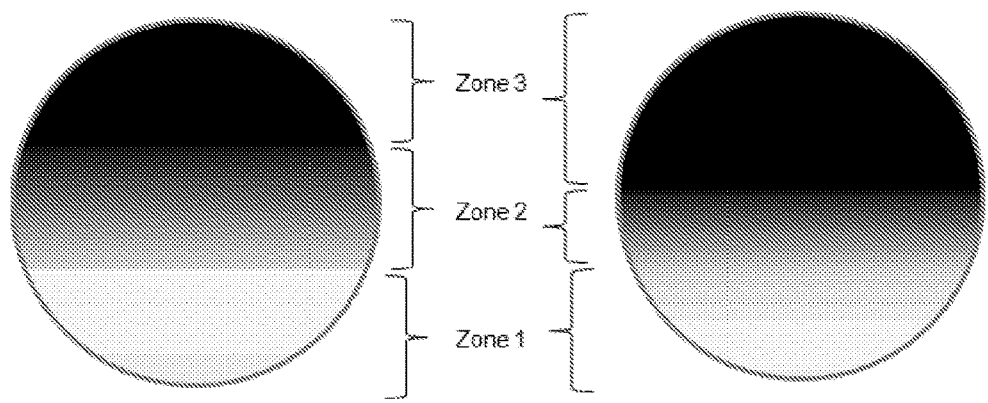
Figure 4:
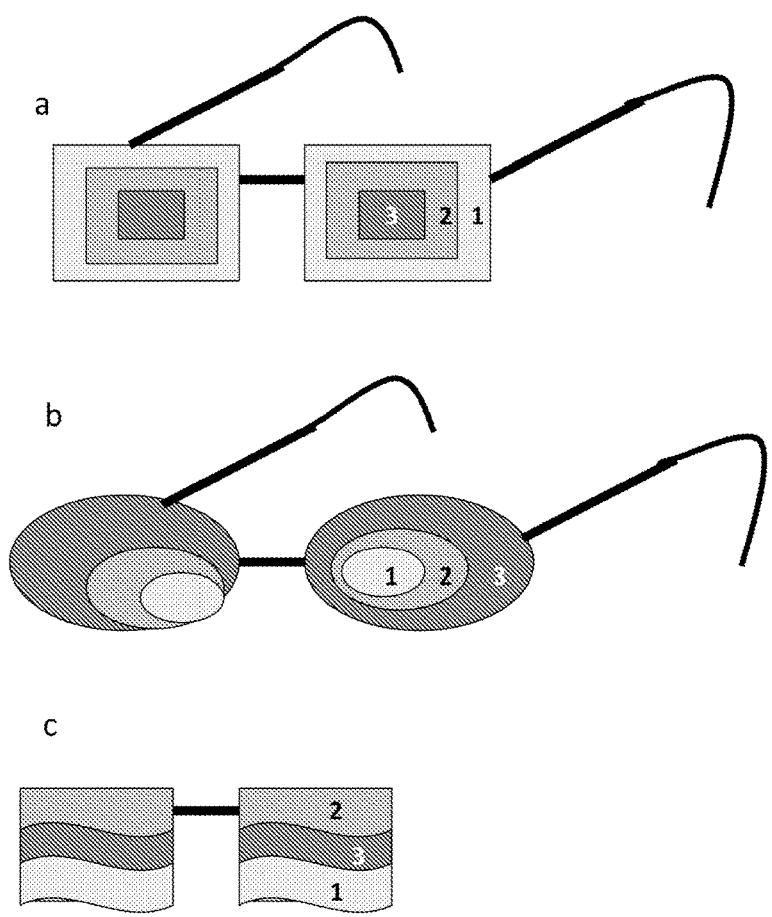
Figure 5:
Figure 5:
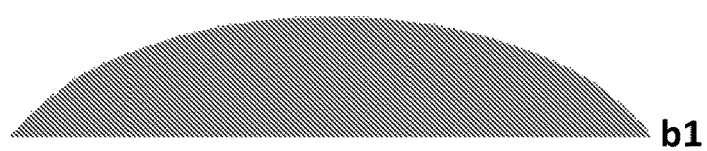
Figure 5:
Figure 5:
Figure 5:

The description which follows refers to the annexed figures, which represent respectively:

FIG. 1: a schematic frontal view of a device for performing step 1) of irradiation of a transparent article, such as lens, according to the first embodiment of the method according to the invention;

FIG. 2: a schematic frontal view of a device for performing step 1) of irradiation of a transparent article, such as lens, according to the second and third embodiments of the method according to the invention;

FIG. 3: a schematic frontal view of lenses having a linear gradient tint according to 3 different zones across lenses (Zone 1, Zone 2 and Zone 3);

FIG. 4: a schematic view of lenses mounted in a pair of frame and having 3 different geometrical zones across lenses (Zone 1, Zone 2 and Zone 3) according to a rectangular shape (FIG. 4*a*), an elliptical shape (FIG. 4*b*) and a wavy shape (FIG. 4*c*):

FIG. 5: a schematic transversal view of gradient filters designed to impart different gradient tints on lenses, FIG. 5*a* corresponding to a linear gradient filter, FIG. 5*b* to annular filters and FIG. 5*c* to square filters.

With reference to FIG. 1, and to the first embodiment of the present invention, a transparent article 1, such as a polycarbonate lens, is positioned under an UV source 2 emitting UV radiation 3, a sliding shutter 4 being interposed between the UV source 2 and the surface layer of the transparent article 1. When the UV source is switched on, the sliding shutter 4 is progressively and linearly slided at a controlled speed along, for example from left to right until the article 1 is completely uncovered, so that the surface layer of the transparent article 1 is progressively exposed to UV radiation 3 causing the surface layer of the transparent article 1 being linearly gradiently photodegraded. Once the sliding shutter 4 has completely slided, exposing the end of the surface of the article 1 to UV radiation, the UV source 2 is switched off. According to this first embodiment, the exposure time of the transparent article 1 decreases from left to right, resulting into the corresponding extent of the surface photodegradation.

According to this first embodiment, the sliding shutter 4 is preferably slided at a constant speed ranging from 1 mm/sec to 50 mm/sec. The constant speed would result in lens with linear gradient.

However, the gradient is not always linear. The gradient may have a specific geometry like annular or elliptic for example, or may have a geometry in accordance with the final lens ready to be mounted in a pair of frames.

With reference to FIGS. 3 and 4, Zone 1 is normally clear or light tinted and corresponds to lenses with a tint of grade 0 transmitting from 80 to 100% of light radiations (Tv from 80 to 100%), or grade 1 (Tv from 43 to 80%), Zone 2 is medium tinted and corresponds to lenses with grade 2 (Tv from 18 to 43%) and Zone 3 is dark tinted and corresponds to lenses with a tint of grade 3 (Tv from 8 to 18%). The lengths, geometry and surface of these three zones vary as per demand. For example in case of a linear gradient such as on FIG. 3, the speed of the sliding shutter 4 can be varied in sequence as Zone 3 (slow speed, exposing the surface layer of the transparent article 1 to UV longer), Zone 2 (medium speed, medium exposure) and Zone 1 (fast speed, minimum exposure). Zone 1 could be left unexposed completely to remain it clear.

The sliding shutter 4 can be made from any opaque material that is able to cut down UV radiation, such as for example metals. Among these materials, aluminum is particularly preferred.

With reference to FIGS. 2 and 5, and to the second and third embodiments of the present invention, a transparent article 1, such as a polycarbonate lens, is positioned under an UV source 2 emitting UV radiation 3, a gradient UV filter 5 being interposed between the UV source 2 and the surface layer of the transparent article 1 during the whole step of UV irradiation after the UV source 2 has been switched on. According to these embodiments, the surface layer of the transparent article 1 is gradiently photodegraded depending on the intensity of UV radiation 3 passing through the gradient UV filter 5.

As a first example corresponding to the second embodiment, the gradient of the UV filter 5 is linear and increases from left to the right so that the intensity of UV radiation 3 passing through the UV filter 5 decreases from the left side towards the right side of the transparent article 1 leading to a surface layer which is linearly less photodegraded from left to right.

As a second example corresponding to the second embodiment and with reference to FIG. 5a, the gradient of the UV filter 5 is linear and decreases from left to right so that the intensity of UV radiation 3 passing through the UV filter 5 increases from the left side towards the right side of the transparent article 1 leading to a surface layer which is linearly more photodegraded from left to right.

As a third example corresponding to the third embodiment and with reference to FIG. 5b2, the gradient of the UV filter 5 is annular and increases gradually from the center towards the periphery of the UV filter 5 so that the intensity of UV radiation 3 passing through the UV filter 5 decreases from the center towards the periphery of the transparent article 1 leading to a surface layer which is annularly more photodegraded from the center towards the periphery of the article.

As a forth example corresponding to the third embodiment and with reference to FIG. 5b1, the gradient of the UV filter 5 is annular and decreases gradually from the center towards the periphery of the UV filter 5 so that the intensity of UV radiation 3 passing through the UV filter 5 increases from the center towards the periphery of the transparent article 1 leading to a surface layer which is annularly more photodegraded from the center towards the periphery of the article.

As a fifth example corresponding to the third embodiment and with reference to FIG. 5c1, the gradient of the UV filter 5 has a square pattern and decreases gradually from the center towards the periphery of the UV filter 5 so that the intensity of UV radiation 3 passing through the UV filter 5 increases from the center towards the periphery of the transparent article 1 leading to a surface layer which is squarely more photodegraded from the center towards the periphery of the article.

As a sixth example corresponding to the third embodiment and with reference to FIG. 5c2, the gradient of the UV filter 5 has a square pattern and increases gradually from the center towards the periphery of the UV filter 5 so that the intensity of UV radiation 3 passing through the UV filter 5 decreases from the center towards the periphery of the transparent article 1 leading to a surface layer which is squarely more photodegraded from the center towards the periphery of the article.

The UV filter can be made of any material that is able to absorb UV radiation. Typical material for the UV filter would be glass, quartz or polymer containing organic (such as for example benzotriazole, benzophenone) or inorganic (such as for example $ZnO$, $TiO_2$) UV absorbers at desired ranges.

The gradient UV filter may need to be custom-made as per requirements. While there could be several ways to do so, one example is, to use a polymer film/sheet with UV absorbing coating in varying thickness across length, in order to result gradient UV absorption.

Other way is to cast/mold UV absorber containing polymer slab with a geometrical gradient in thickness, so as to control amount of UV light transmitting accordingly. Typical examples of such filters with different geometries are shown in FIG. 5. A typical annular gradient filter, made of such UV absorber containing polymer, would be thick at center and the thickness would gradually decrease towards periphery.

According to the second and third embodiments, the duration and intensity of the UV irradiation will determine the degree of photodegradation of the surface layer of the transparent article. Preferably the UV radiation is applied at an intensity ranging from about 2.4 to 48 $J/m^2$ for a period of time ranging from about 0 to 10 minutes, preferably from about 0 to 2 minutes.

The method of the invention may obviously also comprise the irradiation of the article to provoke the photodegradation of the polymeric substrate on two opposite faces of the transparent article (each of the faces being successively subjected to the photodegradation), thus forming two photodegraded surface layers of the polymeric substrate.

At the end of the first step, the polymeric substrate having at least one photodegraded surface layer can be directly engaged into the second step of dyeing.

According to the invention, the second step of dyeing of the article is preferably carried out by a dip process comprising the dip of the polymeric substrate obtained at the end of the first step into a dyeing bath.

In the step of dyeing the transparent article according to the invention, any dye or pigment conventionally used for dyeing transparent polymer articles may be used, including photochromic dyes and pigments.

A UV absorber may also be diffused into the photodegraded layer at this stage.

The conventionally used dyes include the azo dyes, the anthraquinone dyes, infrared absorbers, laser dyes; the azo dyes and the anthraquinone dyes being preferred.

The dyeing baths are conventionally aqueous solutions or dispersions of at least one dye and/or at least one pigment.

These baths preferably also contain an effective amount of a surface-active agent, in particular an alkyl benzene sulfonate. The proportion of surface-active agent in the dyeing baths generally varies from about 0 to 3%, and is preferably about 1% by weight.

The temperature of the dyeing bath, during the dyeing step, is generally between 85 and 100° C.

According to the invention, the dyeing step results into gradient tint density following to the gradients of UV irradiation of the surface layer of the substrate.

After the dyeing step, the transparent articles are preferably subjected to a thermal treatment to stabilize the coloration, at a temperature preferably higher than 100° C., and possibly reaching 140° C., for a sufficient time to fix the coloration, generally one hour or more, preferably about 2 hours.

After the dyeing step and the optional thermal stabilization treatment, it is possible in the method of the invention to proceed to other conventional deposits on at least one face of the polymeric substrate, for example of primer, hard anti-abrasion and anti-reflecting coatings.

Preferably the method of the invention includes a further step of formation of a layer of a hard anti-abrasion coating at least on the photodegraded face of the article, preferably previously coated with a primer.

Any primer composition conventionally used for transparent polymeric article, such as ophthalmic lenses, may be used in the method of the invention, in particular convention shockproof primer layers.

These primer compositions may be deposited on the faces of the article by dipping or centrifugation, and then dried at a temperature of at least 70° C. and up to 100° C., preferably of the order of 90° C., for a time ranging from 2 minutes to 2 hours, generally of the order of 15 minutes, to form primer layers with thickness, after baking, of 0.2 to 2.5 µm, preferably 0.5 to 1.5 µm.

Preferred compositions for hard anti-abrasion coating include compositions based on poly(meth)acrylate and compositions based on alkoxysilane hydrolysate, in particular epoxyhydrolysate.

The thickness of the anti-abrasion coating is generally between 1 and 10 µm and more particularly between 2 and 6 µm.

The method of the invention may also include the formation of an anti-reflection layer on the hard anti-abrasive coating layer.

As an example, the anti-reflection coating may be composed of a mono- or multilayer film, of dielectric materials such as $SiO$, $SiO_2$, $Si_3N_4$, $TiO_2$, $Al_2O_3$, $MgF$, or $Ta_2O_5$, or their mixtures. It is thus possible to prevent the appearance of a reflection at the lens-air interface.

This anti-reflection coating is generally applied by vacuum deposit according to any of the methods well known by the one skilled in the art.

Another object of the present invention is also a gradient tinted ophthalmic lens obtained by a method according to the first object of the present invention.

Although the method of the invention is particularly suited for optical articles and in particular ophthalmic lenses, it can also be applied to impart gradient tints to any polymeric substrates such as films without departing from the scope of the invention.

The invention claimed is:

1. A method for dyeing a transparent article made of a polymeric substrate with gradient tint, said method comprising:
    a) a first step of photodegrading the polymeric substrate of the transparent article, by irradiation of at least one first surface of the article to UV radiations to produce a gradiently photodegraded surface layer of the polymeric substrate, and
    b) a second step of dyeing said first face of the article with a dyeing agent so as to diffuse said dyeing agent into the gradiently photodegraded surface layer of the polymeric substrate;
    wherein during said first step, UV irradiation is applied in a controlled gradient intensity and geometry across the article surface, and after the second step of dyeing, a gradient tint of the transparent article is obtained, said gradient tint matching with the gradient intensity and geometry followed during said first step.

2. The method according to claim 1, wherein the UV radiations are generated by a switchable or retractable UV source.

3. The method according to claim 1, wherein the gradient tint is a linear gradient tint and UV irradiation is controlled linearly by means of a sliding shutter having a main axis, said shutter being interposed between the UV source and the surface layer of the polymeric substrate, and completely overlapping the surface layer of the polymeric substrate before UV source is switched on, said polymeric substrate being progressively slid at a controlled speed along an axis of translation parallel to the main axis of shutter, so as to gradually and completely uncover the surface layer of the polymeric substrate after the UV source has been switched on.

4. The method according to claim 1, wherein the gradient tint is a linear gradient tint and UV irradiation is controlled linearly by means of a gradient UV filter interposed between the UV source and the surface layer of the polymeric substrate during the whole step of UV irradiation, said filter having a linear UV radiation absorption gradient.

5. The method according to claim 1, wherein the gradient tint is a geometrical gradient tint and UV irradiation is controlled geometrically by means of a gradient UV filter interposed between the UV source and the surface layer of the polymeric substrate during the whole step of UV irradiation, said filter having a geometrical UV radiation absorption gradient.

6. The method according to claim 5, wherein the geometrical gradient tint is an annular gradient tint and the filter has an annular UV radiation absorption gradient.

7. The method according to claim 6, wherein the annular UV radiation absorption gradient increases gradually from the center towards the periphery of the filter.

8. The method according to claim 6, wherein the annular UV radiation absorption gradient increases gradually from the periphery towards the center of the filter.

9. The method according to claim 1, wherein the second step of dyeing is carried out by a dip process comprising the dip of the polymeric substrate obtained at the end of the first step into a dyeing bath.

10. The method according to claim 1, wherein the polymeric substrate is a thermoplastic polycarbonate substrate.

11. The method according to claim 10, wherein the thermoplastic polycarbonate substrate is an optical article.

12. The method according to claim 11, wherein the optical article is an ophthalmic lens.

\* \* \* \* \*